US011523593B2

(12) United States Patent
Krogenes et al.

(10) Patent No.: US 11,523,593 B2
(45) Date of Patent: Dec. 13, 2022

(54) FISH PEN SYSTEM WITH COMPENSATION FOR WAVE MOTION

(71) Applicant: Viewpoint AS, Haugesund (NO)

(72) Inventors: Kåre Olav Krogenes, Haugesund (NO); Kjartan Gilje, Vikeså (NO)

(73) Assignee: Viewpoint AS, Haugesund (NO)

( * ) Notice: Subject to any disclaimer, the term of this patent is extended or adjusted under 35 U.S.C. 154(b) by 0 days.

(21) Appl. No.: 16/606,572

(22) PCT Filed: Apr. 20, 2018

(86) PCT No.: PCT/NO2018/050107
§ 371 (c)(1),
(2) Date: Oct. 18, 2019

(87) PCT Pub. No.: WO2018/194462
PCT Pub. Date: Oct. 25, 2018

(65) Prior Publication Data
US 2021/0112785 A1    Apr. 22, 2021

(30) Foreign Application Priority Data

Apr. 21, 2017  (NO) .................................. 20170670

(51) Int. Cl.
*A01K 61/60*      (2017.01)
*A01K 61/80*      (2017.01)
*A01K 61/65*      (2017.01)

(52) U.S. Cl.
CPC .............. *A01K 61/65* (2017.01); *A01K 61/80* (2017.01)

(58) Field of Classification Search
CPC ......... A01K 61/60; A01K 61/65; A01K 61/80
(Continued)

(56) References Cited

U.S. PATENT DOCUMENTS 3,691,994 A * 9/1972 McPherson ............ A01K 61/60
119/223
4,244,323 A * 1/1981 Morimura .............. A01K 61/60
119/223

(Continued)

FOREIGN PATENT DOCUMENTS

| CA | 1337894 | 1/1996 |
| CN | 104855317 | 8/2015 |

(Continued)

OTHER PUBLICATIONS

Norwegian Search Report for 20170670 dated Sep. 19, 2017.
(Continued)

*Primary Examiner* — Monica L Perry
(74) *Attorney, Agent, or Firm* — Andrus Intellectual Property Law, LLP

(57) ABSTRACT

A pen system is for farming aquatic organisms. The pen system has an outer surrounding rigid structure and an internal, closed enclosure. The outer surrounding rigid structure forms an upper portion and a lower portion. The pen system further has: an internal surrounding connecting element, the closed enclosure being attached to the connecting element; and a heave-compensation system having a plurality of fluid-filled cylinders, each fluid-filled cylinder being hingedly attached, in a first end portion, to the connecting element, and being hingedly attached, in a second end portion, to the inside of the rigid structure.

9 Claims, 5 Drawing Sheets

(58) Field of Classification Search
USPC .......................................................... 119/223
See application file for complete search history.

(56) References Cited

U.S. PATENT DOCUMENTS

| | | | | |
|---|---|---|---|---|
| 4,744,331 A * | 5/1988 | Whiffin | ................. | A01K 29/00 119/223 |
| 4,747,369 A * | 5/1988 | Gotmalm | ............... | A01K 61/60 119/223 |
| 4,957,064 A | 9/1990 | Koma et al. | | |
| 5,251,571 A * | 10/1993 | Willinsky | .............. | A01K 61/60 441/29 |
| 5,299,530 A * | 4/1994 | Mukadam | ................ | A01K 61/60 119/223 |
| 5,967,086 A * | 10/1999 | Knott, Sr. | ............... | A01K 61/60 119/223 |
| 5,970,917 A * | 10/1999 | Keith, Jr. | ............... | A01K 61/70 119/223 |
| 6,065,239 A * | 5/2000 | Thomas | ................. | A01K 74/00 43/4.5 |
| 6,216,635 B1 * | 4/2001 | McRobert | .............. | A01K 61/60 119/201 |
| 7,476,074 B2 * | 1/2009 | Jakubowski | ............ | F03D 13/25 415/1 |
| 10,918,094 B2 * | 2/2021 | Sandstad | ............... | A01K 61/10 |
| 2006/0207516 A1 | 9/2006 | Tuerk | | |
| 2012/0006277 A1 * | 1/2012 | Troy | ....................... | A01K 61/65 119/223 |
| 2012/0167829 A1 * | 7/2012 | Madsen | ................. | A01K 61/10 119/223 |
| 2013/0112151 A1 | 5/2013 | Mizrachi | | |
| 2013/0284105 A1 * | 10/2013 | Han | ........................ | A01K 61/60 119/230 |
| 2018/0139935 A1 * | 5/2018 | Zheng | .................... | A01K 61/65 |
| 2018/0317461 A1 * | 11/2018 | Meeker | ................... | A01K 61/60 |
| 2019/0059339 A1 * | 2/2019 | Jakobsen | ............... | A01K 61/60 |
| 2019/0150409 A1 * | 5/2019 | Krogenes | ............... | A01K 61/10 |
| 2019/0150410 A1 * | 5/2019 | Dwyer | ................... | A01K 61/80 |

FOREIGN PATENT DOCUMENTS

| | | | | |
|---|---|---|---|---|
| CN | 204949078 | | 1/2016 | |
| NO | 303313 | | 6/1998 | |
| NO | 20120492 | | 10/2013 | |
| NO | 20141378 | | 10/2015 | |
| WO | WO-8703170 A1 * | | 6/1987 | ............ A01K 61/60 |
| WO | 9831217 | | 7/1998 | |
| WO | 2000010381 A1 | | 3/2000 | |
| WO | WO-2009002190 A1 * | | 12/2008 | ............ A01K 61/60 |
| WO | WO-2010134825 A1 * | | 11/2010 | ............ A01K 61/60 |
| WO | 2013162375 | | 10/2013 | |
| WO | WO-2015099540 A1 * | | 7/2015 | ............ A01K 79/00 |

OTHER PUBLICATIONS

International Search Report and the Written Opinion for PCT/NO2018/050107, dated Jun. 28, 2018.
Great Britain Examination Report for corresponding Application No. GB2204325.1 dated Apr. 13, 2022.
Chilean Official Action for corresponding Application No. 202000757 dated May 1, 2021.

* cited by examiner

FISH PEN SYSTEM WITH COMPENSATION FOR WAVE MOTION

CROSS-REFERENCE TO RELATED APPLICATIONS

This application is the U.S. national stage application of International Application PCT/NO2018/050107, filed Apr. 20, 2018, which international application was published on Oct. 25, 2018, as International Publication WO 2018/194462 in the English language. The International Application claims priority of Norwegian Patent Application No. 20170670, filed Apr. 21, 2017. The international application and Norwegian applications are both incorporated herein by reference, in entirety.

FIELD

The invention relates to a fish pen system for fish farming. The invention relates to a fish pen system which is suitable for positioning in unsheltered localities. More specifically, the invention relates to a fish pen system with a rigid, outer structure surrounding an internal closed enclosure for fish. The closed enclosure may consist of a net bag. The net bag is attached, in its upper portion, to an internal connecting element. Even more specifically, the invention relates to a fish pen system including a heave-compensation system between the outer, rigid structure and the inner connecting element, so that the inner connecting element lies substantially at rest and is not affected by wave movements.

BACKGROUND

The farming of fish, especially salmonids, has developed from simple and relatively small fish pens with a frame made of wood into large annular fish pens. The annular fish pens are provided with a circular buoyancy body which typically consists of two concentric plastic rings. The plastic rings may carry a walkway. The small fish pens were typically placed in sheltered coves and small, roundish fjords with narrow inlets. As the fish pens became larger and deeper, the fish pens were placed in localities farther from shore. These localities are more exposed to wind and waves.

It is also known that the fish pens may have a square shape and be surrounded by a walkway made of steel. Even though fish pens with plastic rings or with steel walkways can withstand some waves, they are still placed in localities that are relatively sheltered from waves and wind.

To prevent infection from fish-pathogenic organisms between the fish farms, there are requirements for distances between the farms. There is therefore a limited number of localities along a coastline that satisfy the requirement for shielding and for distance to a neighbouring farm.

There is a risk that a fish farm may be damaged in bad weather. The fish in the fish farm may then escape. The farmer then suffers a loss in the form of destroyed equipment and loss of fish. The escape of farmed fish is also undesirable. Escaped salmonids, in particular, will seek towards rivers when they become sexually mature, and mix with the wild population.

There is thus a need for fish farms that can tolerate being positioned in more exposed localities than the known fish farms. For this purpose, it has been suggested to use constructionally altered oil rigs provided with farming pens. Such oil rigs may be mobile rigs, such as semi-submersible rigs, and fixed rigs.

Because of their size, semi-submersible rigs will be affected differently by waves than fish pens that are provided with surrounding floating means. Fixed rigs will not be affected by waves. There is thus a need to connect a large floating unit, like a semi-submersible rig, and a smaller unit, like a fish pen for fish farming, in such a way that the connection is flexible enough for the large unit and the smaller unit to move in dissimilar ways in waves.

There is further a need to be able to connect a fixed unit, like a fixed rig, which does not move with waves and a smaller unit which moves in waves.

SUMMARY

The invention has for its object to remedy or reduce at least one of the drawbacks of the prior art or at least provide a useful alternative to the prior art.

The object is achieved through the features that are specified in the description below and in the claims that follow.

The invention relates, more specifically, to a pen system for farming aquatic organisms, the pen system comprising an outer, surrounding, rigid structure and an internal, closed enclosure; the outer, surrounding, rigid structure forming an upper portion and a lower portion, and the pen system further including:
 an internal, surrounding connecting element, the closed enclosure being attached to the connecting element;
 a heave-compensation system comprising a plurality of fluid-filled cylinders, each fluid-filled cylinder being hingedly attached, in a first end portion, to the connecting element, and being hingedly attached, in a second end portion, to the inside of the rigid structure.

The aquatic organisms may be fish, such as salmonids.

The fluid-filled cylinders may be hydraulic cylinders.

The connecting element may be formed from a rigid material. The connecting element may be provided with a floating element.

On its inside, the rigid structure may be provided with a plurality of substantially vertical guides, and the connecting element may be provided with a plurality of guiding members which are each complementary to a respective guide.

The pen system may comprise a framework surrounding the enclosure. The framework may consist of a jointed connecting element, a ring, the ring possibly being jointed, and a plurality of substantially vertically oriented rigid, elongated guides between the connecting element and the ring. The enclosure may be provided with a surrounding bottom ring to which the enclosure may be attached. The bottom ring may include a plurality of sections which may be connected to each other by joints. In a middle portion, each section may be provided with a guiding member which may be arranged to be moved along the guide. In their lower positions, the guiding members may rest against the ring. The enclosure may further be provided with a surrounding intermediate ring. The enclosure may be attached to the intermediate ring. The intermediate ring may comprise a plurality of sections which are connected to each other by joints. In a middle portion, each section may be provided with a guiding member which is arranged to be moved along the guide. The bottom ring and the intermediate ring may, with advantage, have negative buoyancy. The bottom ring and the intermediate ring may each be provided with respective lifting members, such as a wire and a winch, so that the bottom ring and the intermediate ring can be raised to the connecting element.

The pen system may include a plurality of chambers for storing feed. Each chamber may be provided with a special, separate feed distributor. Each chamber may comprise one or more containers for feed.

The surrounding rigid structure may be provided with a tight wall between the upper portion and a surrounding, substantially horizontal reinforcement between the upper portion and the lower portion, and the pen system may include a swash bulkhead on the inside of the tight wall.

The heave-compensation system may be a passive heave-compensation system. The fluid-filled cylinders forming part of the heave-compensation system may be arranged to generate a liquid flow for the operation of an electric generator.

On its inside, the rigid structure may be provided with a plurality of substantially vertical guides, and the connecting element may be provided with a plurality of guiding members which are each complementary to a respective guide.

A pen system for farming aquatic organisms, wherein the pen system may include an outer surrounding rigid structure and an internal closed enclosure is described as well; the outer surrounding rigid structure may form an upper portion and a lower portion. The outer surrounding rigid structure may comprise a plurality of chambers for storing feed for the aquatic organisms. The aquatic organisms may be fish, such as salmonids. Each chamber may be provided with a separate feed distributor. Each chamber may comprise one or more containers for feed.

A pen system for farming aquatic organisms, wherein the pen system may include an outer surrounding rigid structure and an internal closed enclosure is described as well; the outer surrounding rigid structure may form an upper portion and a lower portion. The aquatic organisms may be fish, such as salmonids. The outer surrounding rigid structure may comprise a tight wall from the upper portion downwards in a water column, and the pen system may include a swash bulkhead on the inside of the tight wall.

The tight wall may extend between the upper portion and a surrounding, substantially horizontal reinforcement between the upper portion and the lower portion of the surrounding rigid structure.

The pen system may include a plurality of swash bulkhead. On a side facing the enclosure, the swash bulkhead may be provided with a plurality of openings. In a lower portion, the swash bulkhead may be completely open downwards. In a lower portion, the swash bulkhead may be partially open downwards.

A pen system for farming aquatic organisms, wherein the pen system may include an outer surrounding rigid structure and an internal closed enclosure is described as well; the outer surrounding rigid structure may form an upper portion and a lower portion. The aquatic organisms may be fish, such as salmonids. The pen system may include a framework comprising a connecting element, a ring and a plurality of substantially vertically oriented elongated guides between the connecting element and the ring. The framework may surround the enclosure, and the framework may be positioned between the enclosure and the outer rigid structure.

The elongated guides may be formed from a rigid material.

The connecting element may comprise a plurality of sections and a plurality of joints so that there is one joint between two sections. The connecting element may include an attachment for the attachment of one or more hydraulic cylinders.

The ring may comprise a plurality of sections connected by joints.

The enclosure may be provided with a surrounding bottom ring. The bottom ring may be provided with a plurality of guiding members, and each guiding member may be arranged to be moved vertically along a respective elongated guide. The bottom ring may comprise a plurality of sections and a plurality of joints so that there is one joint between two sections. The bottom ring may be provided with a lifting member for raising the bottom ring along the elongated guides.

The enclosure may be provided with a surrounding intermediate ring. The intermediate ring may be provided with a plurality of guiding members, and each guiding member may be arranged to be moved vertically along a respective elongated guide. The intermediate ring may comprise a plurality of sections and a plurality of joints so that there is one joint between two sections. The intermediate ring may be provided with a lifting member for raising the bottom ring along the elongated guides.

BRIEF DESCRIPTION OF THE DRAWINGS

In what follows, examples of preferred embodiments are described, which are visualized in the accompanying drawings, in which.

DETAILED DESCRIPTION OF THE DRAWINGS

Figure 1:
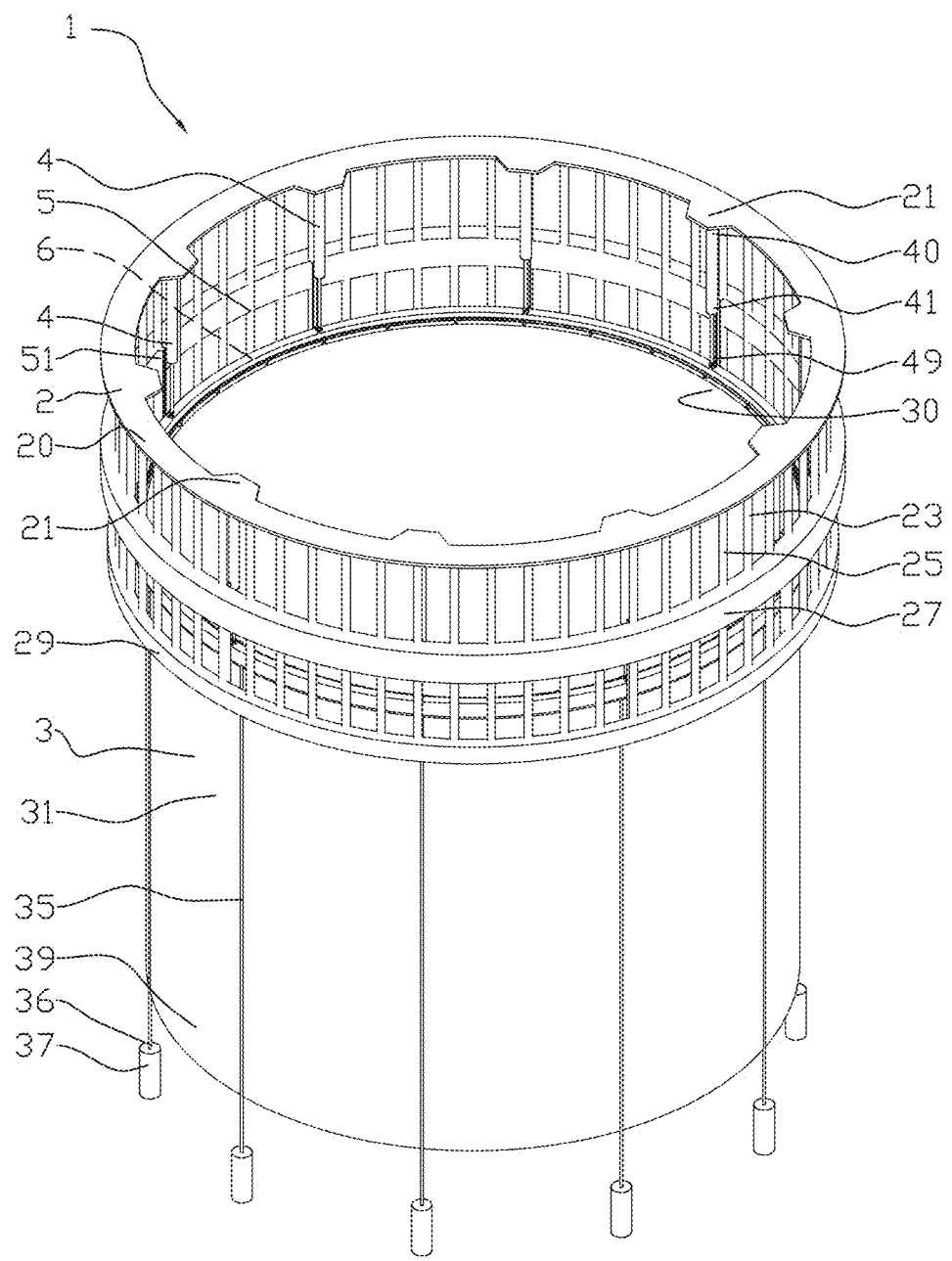
FIG. 1 shows a perspective view of a pen system according to the invention in a first embodiment.

In the figures, the reference numeral 1 indicates a pen system according to the invention. The pen system 1 comprises an outer, surrounding rigid structure 2 and an internal enclosure 3. The pen system 1 is provided with a heave-compensation system 4 which connects the outer, rigid structure 2 to an internal, surrounding, annular and rigid connecting element 5. The connecting element 5 is provided with a floating element 6. The internal enclosure 3 is connected to the connecting element 5.

The rigid structure 2 forms an upper portion 20 and a lower portion 29. The upper portion is shown provided with a plurality of projections 21, see FIG. 1. The heave-compensation system 4 is attached to the upper portion 20 in the projections 21. The rigid structure 2 comprises a wave breaker 23. The wave breaker 23 is shown as a plurality of uprights 25 between the upper portion 20 and the lower portion 29. A reinforcement 27 between the upper portion 20 and the lower portion 29 connects the uprights 25.

Figure 2:
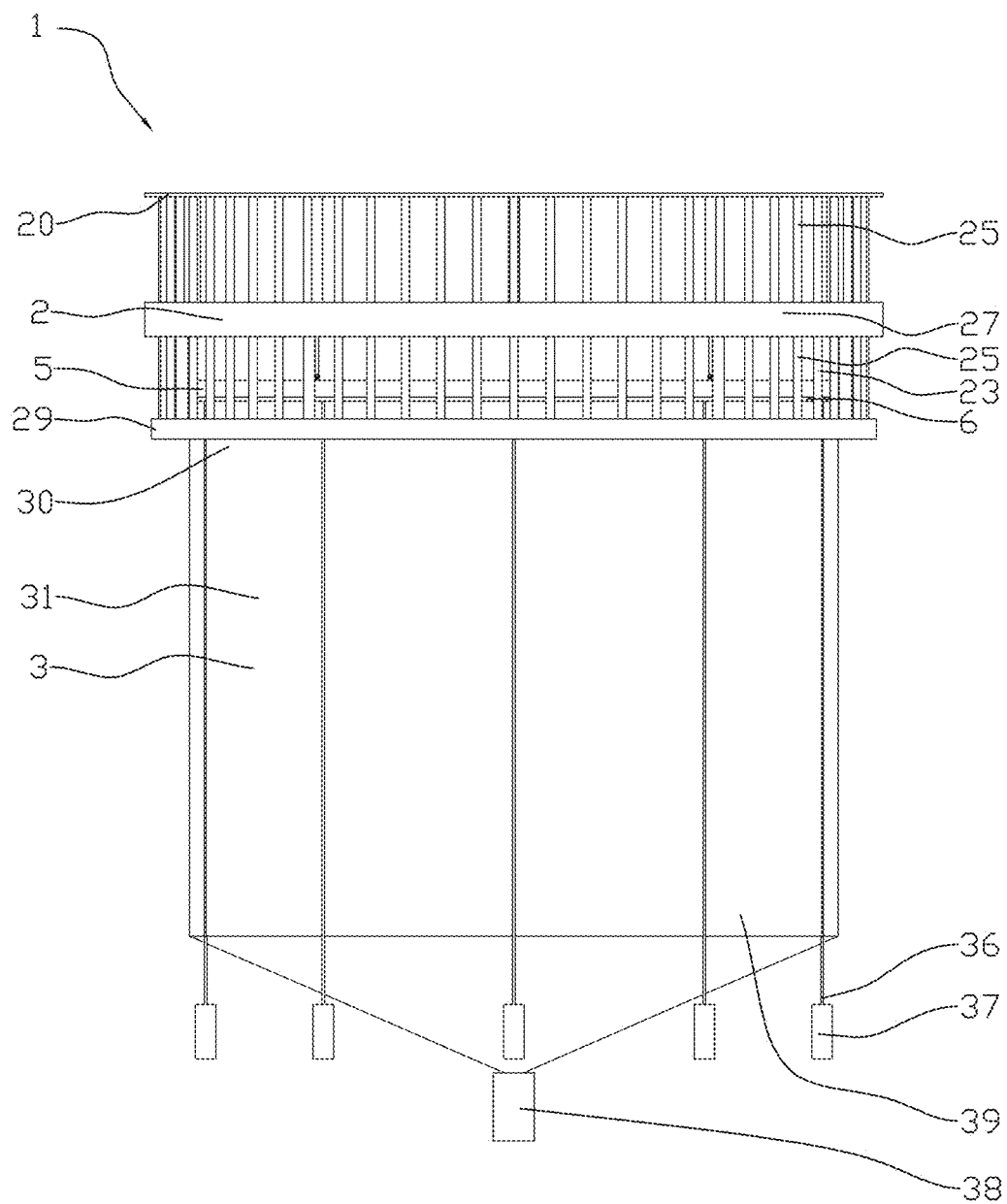
FIG. 2 shows the same as FIG. 1 in a side view.
Figure 3:
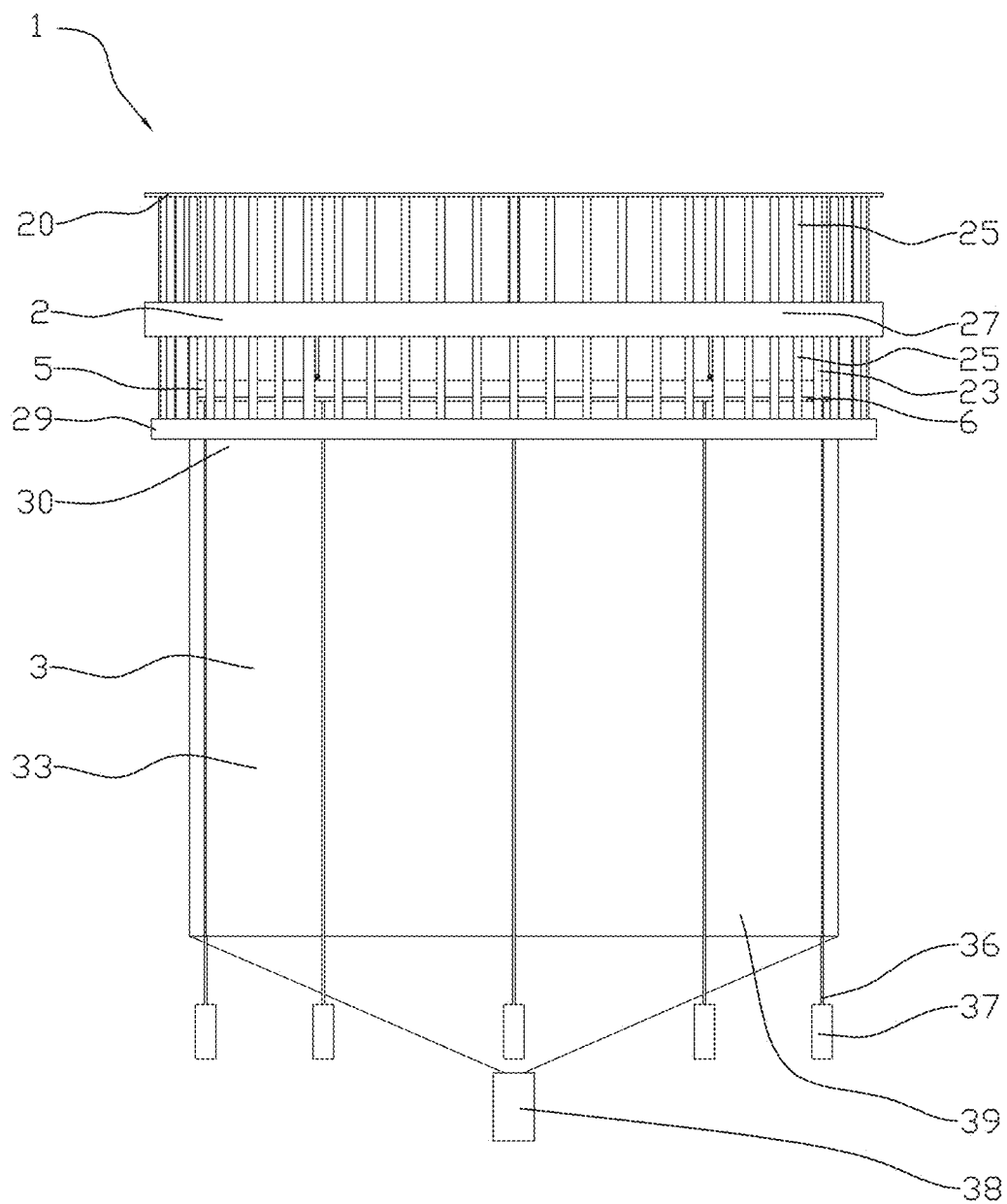
FIG. 3 shows the same as FIG. 2 with a tight bag.

The internal enclosure 3 is attached, in an upper portion 30, to the connecting element 5. The enclosure 3 may consist of a net bag 31. In another embodiment, the enclosure 3 may consist of a tight bag 33 formed from a watertight cloth. The enclosure 3 is shown provided with a plurality of plumb lines 35 attached to the enclosure 3. The plumb lines 35 are provided with weights 37 at their end portions 36. The weights 37 may project down beyond the lower portion 39 of the enclosure 3. The enclosure 3 may further be provided with a centre weight 38 in its lower portion 39, see FIGS. 2 and 3.

The heave-compensation system 4 is shown with a plurality of fluid-filled cylinders 41. The fluid-filled cylinders 41 may be hydraulic cylinders. Each fluid-filled cylinder 41 is hingedly attached, in a first end portion 49, to the connecting element 5. Each fluid-filled cylinder 41 is hingedly attached, in a second end portion 40, to the rigid structure 2 in the projection 21.

On its inside, the rigid structure 2 is provided with a plurality of substantially vertical guides 51 as shown in FIG. 1. The guide 51 may be a groove or a rail. The connecting element 5 is provided with a guiding member (not shown) complementarily fitting the guide 51.

The fluid-filled cylinders 41 may be arranged to generate a liquid flow in a conduit (not shown) when the enclosure 3 and the connecting element 5 are moving relative to the rigid structure 2. The liquid flow may drive an electric generator (not shown).

The connecting element 5 forms a walkway between the rigid structure 2 and the enclosure 3. Any necessary railing and support for a jump net and a possible bird net are not shown. A feeding system and other necessary equipment known to the person skilled in the art are not shown.

The fluid-filled cylinders 41 are arranged to form part of a passive heave-compensation system in which the fluid-filled cylinders 41 are each provided with a gas accumulator (not shown) as is known in the art.

In one embodiment, the rigid structure 2 may be movably attached to a platform (not shown). The rigid structure 2 is further provided with buoyancy means such as one or more pontoons (not shown). The rigid structure 2 will follow the wave movements. The rigid structure 2 will function as a wave breaker. Because of its size, the rigid structure 2 will also damp the wave movement. The fluid-filled cylinders 41 of the passive heave-compensation system will hold the connecting element 5 at substantially the same absolute height independently of the wave movements. In other words, the connecting element 5 will be stationary. The internal enclosure 3 will thereby also be kept stationary and, in that way, wear on the enclosure 3 is avoided.

Figure 4:
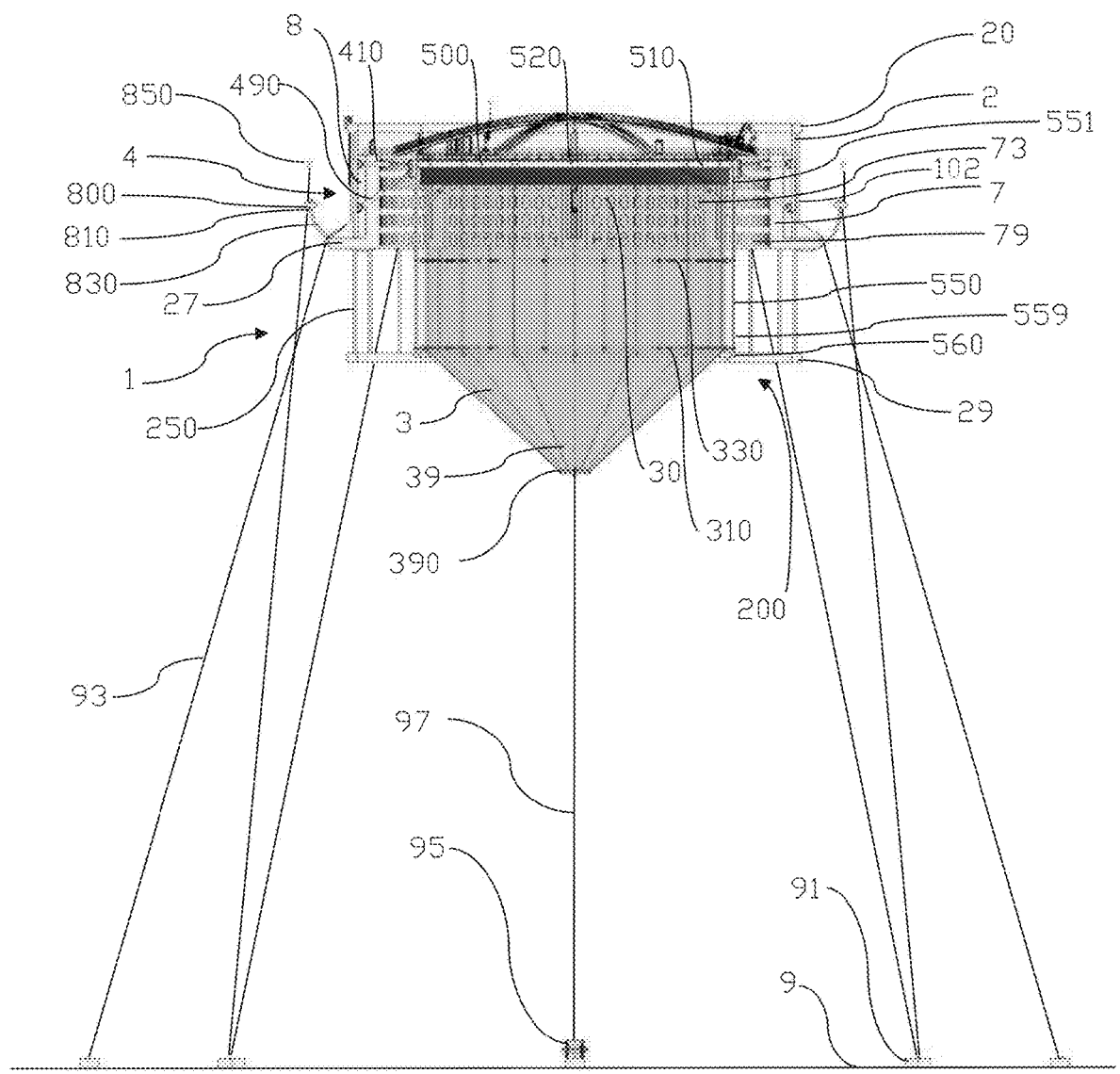
FIG. 4 shows a partially cutaway side view of the pen system in a second embodiment.
Figure 5:
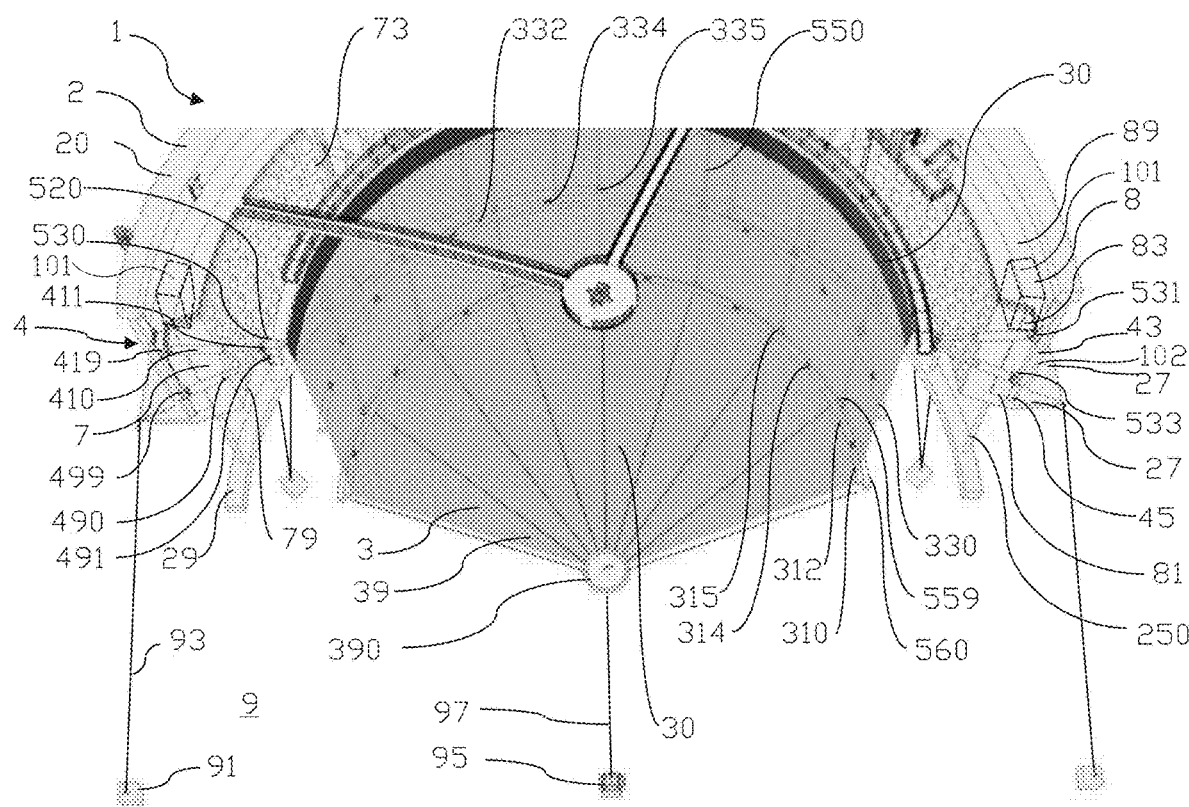
FIG. 5 shows the same as figure but from a different angle.

FIGS. 4 and 5 show an alternative embodiment of the pen system 1. The outer rigid structure 2 of the pen system 1 is anchored to a plurality of anchors 91 on a seabed 9 via a plurality of ties 93. The ties 93 are shown attached to the reinforcement 27. The rigid structure 2 is provided with a tight wall 102 between the upper portion 20 and the reinforcement 27.

A plurality of uprights 250 connect the lower portion 29 to the reinforcement 27.

In one embodiment, the lower portion 39 of the enclosure 3 is provided with a pull member 390. In this embodiment, the pen system 1 includes a winch 95 on the seabed 9. The winch 95 is, in the main, positioned perpendicularly below the enclosure 3. The pull member 390 is connected to the winch 95 by an elongated body 97, such as a wire.

At its upper portion 30, the enclosure 3 is attached to a jointed connecting element 500 surrounding the enclosure 3. The connecting element 500 comprises a plurality of sections 510. In a joint 520 between two sections 510, the connecting element 500 is provided with an attachment 530. The joint 520 may be formed from metal, whereas the sections 510 may be formed from a robust, elastic material.

In this embodiment, the heave-compensation system 4 is shown with a plurality of upper fluid-filled cylinders 410 and a plurality of lower fluid-filled cylinders 490. The fluid-filled cylinders 410, 490 may be hydraulic cylinders. Each fluid-filled upper cylinder 410 is hingedly attached, in a first end portion 411, to the attachment 530 and hingedly attached, in an opposite second end portion 419, to a wall attachment 531 on the inside of the rigid structure 2, see FIG. 5. Each fluid-filled lower cylinder 490 is hingedly attached, in a first end portion 491, to the attachment 530 and hingedly attached, in an opposite second end portion 499, to a wall attachment 533 on the inside of the rigid structure 2, see FIG. 5. The attachment 530 is adapted for the first end portions 411, 491 of the cylinders 410, 490 to be rotatable around both a horizontal axis and a vertical axis through the attachment 530.

The wall attachments 531, 533 are adapted for the second end portions 419, 499 of the cylinders 410, 490 to be rotatable around both a horizontal axis and a vertical axis through the wall attachments 531, 533. The upper cylinder 410 has a longitudinal axis which does not coincide with the longitudinal axis of the lower cylinder 490. Together with the inside of the rigid structure 2, a triangular shape is formed, seen from the side.

The wall attachments 531 and 533 are attached in pairs to a rail 43, see FIG. 5. The rail 43 is positioned in a groove 45 on the inside of the rigid structure 2. The rail may be moved vertically in the groove 45.

The fluid-filled cylinders 410, 490 may be arranged to generate a liquid flow in a conduit (not shown) when the enclosure 3 and the connecting element 500 are moving relative to the rigid structure 2. The liquid flow may drive an electric generator (not shown).

On its inside, the rigid structure 2 is provided with a plurality of swash bulkheads 7. On the side facing the enclosure 3, the swash bulkhead 7 is provided with a plurality of openings 73. The openings 73 are arranged in horizontal rows and in vertical columns as shown in FIGS. 4 and 5. The swash bulkhead 7 may be completely open or may be partially open in its lower portion 79 which faces downwards, so that water may enter the swash bulkhead 7 from below. The swash bulkhead 7 forms a room between the inside of the rigid structure 2 and the side facing inwards towards the enclosure 3 in that there is a distance between the inside of the rigid structure 2 and the side facing inwards towards the enclosure 3. The fluid-filled cylinders 410, 490 are attached in pairs to the inside of the rigid structure 2 between two swash bulkheads 7.

On its inside, the rigid structure 2 is provided with a plurality of chambers 8 for storing a feed (not shown). The chamber 8 is defined by a bottom 81, by the rigid structure 2 on a side and the swash bulkhead 7 on an opposite side, by lateral bulkheads 83 and a top 89, see FIG. 5. The lateral bulkheads 83 face pairs of cylinders 410, 490 and the cylinders 410, 490 are attached in pairs to the inside of the rigid structure 2 between two chambers 8. Each chamber 8 may comprise one or more containers for feed (not shown).

In one embodiment, the chamber 8 may be provided with a feed-filling device 800 which includes a contact member 810, a feed hose 830 extending between the contact member 810 and the chamber 8, and a marker buoy 850 which keeps the contact member 810 afloat, see FIG. 4. The marker buoy 850 may be attached to an anchor 91. A vessel transporting feed (not shown) may be arranged to connect to the contact member 810 and pneumatically convey feed from the vessel to the chamber 8 or to the one or more containers for feed inside the chamber 8. Each chamber 8 may be provided with a separate feed-filling device 800. The pen system 1 may include internal feed conveyance (not shown) between chambers 8 so that the pen system 1 comprises more chambers 8 than feed-filling devices 800.

Each chamber 8 may be provided with a feed distributor 101 of its own, for conveying feed from the chamber 8 to the enclosure 3. The feed distributor 101 may be of a known type, like a pneumatic feed distributor carrying feed to the enclosure 3 through a hose and up to a feed spreader.

The pen system 1 includes a plurality of elongated guides 550 which are each attached, in one end portion 551, to the jointed connecting element 500, and are attached, in an opposite end portion 559, to a ring 560. The guides 550 may be formed from a rigid material. The ring 560 may be continuous. The ring 560 may comprise sections connected by joints (not shown). The ring 560 surrounds the enclosure 3, see FIGS. 4 and 5. The connecting element 500, the guides 550 and the ring 560 form an outer framework 200 for the enclosure 3.

The enclosure 3 is provided with a surrounding bottom ring 310. The enclosure 3 is attacked to the bottom ring 310. The bottom ring 310 may comprise a plurality of sections 312 connected by joints 314, see FIG. 5. Each section 312 is provided, in a middle portion, with a guiding member 315 which is arranged to be moved along the guide 550. In their lower positions, the guiding members 315 will abut against the ring 560. The enclosure 3 may further be provided with a surrounding intermediate ring 330. The enclosure 3 is attached to the intermediate ring 330. The intermediate ring 330 may comprise a plurality of sections 332 connected by joints 334, see FIG. 5. Each section 332 is provided, in a middle portion, with a guiding member 335 which is arranged to be moved along the guide 550. The bottom ring 310 and the intermediate ring 330 advantageously have negative buoyancy.

The bottom ring 310 and the intermediate ring 330 are each provided with respective lifting members (not shown), such as a wire and a winch, so that the bottom ring 310 and the intermediate ring 330 can be raised to the connecting element 500.

The pen system 1 includes a plurality of chambers 8 for feed, each with its own feed distributor 101. This gives the feed system 1 good reliability in maintaining the feeding of fish (not shown) even if a feed distributor 101 falls out of operation because of a mechanical/electrical fault or because the hose to the enclosure 3 clogs up. A plurality of chambers 8 also makes it possible to store feed of different sizes in the pen system, or different feeds of the same size, but with different properties or compositions.

The bottom ring 310 and the intermediate ring 330 keep the enclosure 3 expanded. By raising the bottom ring 310 and the intermediate ring 330, the volume of the enclosure 3 can be adjusted. By raising the bottom ring 310 and the intermediate ring 330 all the way up to the connecting element 500, the volume of the enclosure 3 becomes substantially reduced. The fish are crowded, so that it becomes possible to handle the fish with, for example, a fish pump. The negative buoyancy of the bottom ring 310 and the intermediate ring 330 results in the submerged portion of the enclosure 3 sinking downwards along the guide 550.

In one embodiment, the rigid structure 2 is provided with a tight wall 102 between the upper portion 20 and the reinforcement 27. This may lead to undesired swashing inside the rigid structure 2 in that some of the energy of the waves propagates under the rigid structure 2 and in. The swash bulkhead 7 counteracts this. The swash bulkhead 7 also damps waves within the rigid structure 2.

It should be noted that all the above-mentioned embodiments illustrate the invention, but do not limit it, and persons skilled in the art may construct many alternative embodiments without departing from the scope of the attached claims. In the claims, reference numbers in brackets are not to be regarded as restrictive.

The use of the verb "to comprise" and its different forms does not exclude the presence of elements or steps that are not mentioned in the claims. The indefinite article "a" or "an" before an element does not exclude the presence of several such elements.

The fact that some features are indicated in mutually different dependent claims does not indicate that a combination of these features cannot be used with advantage.

The invention claimed is:

1. A pen system for farming aquatic organisms, the pen system comprising an outer surrounding rigid structure and an internal closed enclosure, the internal closed enclosure comprising a net bag, the outer surrounding rigid structure forming an upper portion and a lower portion, and the outer surrounding rigid structure having buoyancy and having a plurality of anchors configured to anchor the pen system to a seabed, wherein the pen system further comprises:
   an internal surrounding connecting element positioned inside the outer surrounding rigid structure and attached to the upper portion of the internal closed enclosure; and
   a heave-compensation system comprising a plurality of fluid-filled cylinders, each of the fluid-filled cylinders being hingedly attached, in a first end portion, to the internal surrounding connecting element, and being hingedly attached, in a second end portion, to an inside of the outer surrounding rigid structure.

2. The pen system according to claim 1, wherein the internal surrounding connecting element is provided with a floating element.

3. The pen system according to claim 1, wherein the outer surrounding rigid structure is provided with a plurality of vertical grooves on the inside of the outer surrounding rigid structure, and each of the fluid-filled cylinders are in the second end portion thereof attached to a rail adapted to move in one of the plurality of vertical grooves.

4. The pen system according to claim 1, wherein the pen system includes a framework surrounding the internal closed enclosure.

5. The pen system according to claim 1, wherein the pen system comprises a plurality of chambers for storing feed on the inside of the outer surrounding rigid structure.

6. The pen system according to claim 5, wherein each of the plurality of chambers is provided with a feed distributor.

7. The pen system according to claim 1, wherein the outer surrounding rigid structure is provided with a tight wall between the upper portion and a reinforcement, the reinforcement being positioned between the upper portion and the lower portion, and the pen system includes a swash bulkhead on an inside of the tight wall.

8. The pen system according to claim 1, wherein the heave-compensation system is a passive heave-compensation system.

9. The feed system according to claim 1, wherein the fluid-filled cylinders are arranged to generate a liquid flow for operating an electric generator.

\* \* \* \* \*